United States Patent
Stevenson et al.

(10) Patent No.: US 11,703,388 B2
(45) Date of Patent: Jul. 18, 2023

(54) OPTICAL SPECTROMETER MODULES, SYSTEMS AND METHODS FOR OPTICAL ANALYSIS WITH MULTIPLE LIGHT BEAMS

(71) Applicant: Agilent Technologies, Inc., Santa Clara, CA (US)

(72) Inventors: Hugh Charles Stevenson, Hughesdale (AU); David Death, Melbourne (AU); Eran Lande, Melbourne (AU)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/479,132

(22) PCT Filed: Jan. 16, 2018

(86) PCT No.: PCT/IB2018/050245
§ 371 (c)(1),
(2) Date: Jul. 18, 2019

(87) PCT Pub. No.: WO2018/134723
PCT Pub. Date: Jul. 26, 2018

(65) Prior Publication Data
US 2019/0391014 A1 Dec. 26, 2019

(30) Foreign Application Priority Data
Jan. 19, 2017 (AU) .............................. 2017900162

(51) Int. Cl.
*G01J 3/42* (2006.01)
*G01N 21/03* (2006.01)
*G01N 21/27* (2006.01)

(52) U.S. Cl.
CPC ............ *G01J 3/42* (2013.01); *G01N 21/0332* (2013.01); *G01N 21/274* (2013.01); *G01N 2021/0367* (2013.01); *G01N 2201/08* (2013.01)

(58) Field of Classification Search
CPC .......... G01J 3/42; G01J 3/0218; G01J 3/0221; G01J 2001/062; G01N 21/0332;
(Continued)

(56) References Cited

U.S. PATENT DOCUMENTS 2,388,105 A * 10/1945 Wilson ...................... G01J 3/32
346/33 A
2,437,323 A * 3/1948 Heigl ........................ G01J 3/42
356/309
(Continued)

FOREIGN PATENT DOCUMENTS

CN 1338623 A 3/2002
CN 1910489 A 2/2007
(Continued)

OTHER PUBLICATIONS

A machine translation of Masato (JP H01233345) (Year: 1989).*
(Continued)

*Primary Examiner* — Tarifur R Chowdhury
*Assistant Examiner* — Jonathon Cook

(57) ABSTRACT

A method of optical analysis comprises receiving light at an optical spectrometer module from a light source, distributing the received light into two or more light beams with a light distribution component of the optical spectrometer module, concurrently exposing each of a reference and one or more test samples to one of the two or more light beams, and concurrently measuring a property of the light associated with each of the reference sample and one or more test samples with a corresponding detector.

14 Claims, 6 Drawing Sheets

(58) Field of Classification Search
CPC ......... G01N 21/274; G01N 2021/0367; G01N 2201/08; G01N 2201/0826
See application file for complete search history.

(56) References Cited

U.S. PATENT DOCUMENTS

| | | | | |
|---|---|---|---|---|
| 2,683,220 A * | 7/1954 | Gross | ................ | G01J 3/42 250/233 |
| 2,690,093 A * | 9/1954 | Edgar | ................ | G01J 3/42 356/309 |
| 4,012,147 A * | 3/1977 | Walrafen | ................ | G01J 3/02 356/326 |
| 4,975,237 A * | 12/1990 | Watling | ................ | G01J 3/02 356/338 |
| 5,016,963 A * | 5/1991 | Pan | ................ | G02B 6/245 385/115 |
| 6,741,348 B2 | 5/2004 | Larsen et al. | | |
| 8,619,253 B2 * | 12/2013 | Yu | ................ | G01N 21/03 356/246 |
| 2003/0091277 A1 * | 5/2003 | Mei | ................ | G02B 6/4249 385/33 |
| 2003/0160961 A1 | 8/2003 | Hafeman et al. | | |
| 2003/0227628 A1 * | 12/2003 | Kreimer | ................ | G01N 21/6428 356/419 |
| 2007/0127027 A1 | 6/2007 | Kralik et al. | | |
| 2010/0045993 A1 | 2/2010 | Martini et al. | | |
| 2010/0228089 A1 * | 9/2010 | Hoffman | ................ | H01S 5/06216 600/182 |
| 2014/0115022 A1 * | 4/2014 | Yasuno | ................ | G01B 9/02091 708/204 |
| 2014/0240951 A1 * | 8/2014 | Brady | ................ | G02B 6/29362 362/19 |
| 2017/0010154 A1 * | 1/2017 | Spudich | ................ | G01N 21/251 |
| 2017/0307525 A1 * | 10/2017 | Langhoff | ................ | G01N 21/03 |
| 2018/0136040 A1 * | 5/2018 | Sodeoka | ................ | G01N 21/65 |

FOREIGN PATENT DOCUMENTS

| | | |
|---|---|---|
| CN | 102141441 A | 8/2011 |
| CN | 102232181 A | 11/2011 |
| CN | 202101758 U | 1/2012 |
| CN | 103109176 A | 5/2013 |
| CN | 103499391 A | 1/2014 |
| CN | 103748442 A | 4/2014 |
| CN | 104833624 A | 8/2015 |
| DE | 19952652 A1 | 4/2001 |
| JP | S54113382 A | 9/1979 |
| JP | S6039533 A | 3/1985 |
| JP | H01233345 A | 9/1989 |
| JP | H04160344 A | 6/1992 |
| JP | H10221242 A | 8/1998 |
| JP | 2007155620 A | 6/2007 |
| WO | 2012138236 A1 | 10/2012 |
| WO | 2016121946 A1 | 8/2016 |

OTHER PUBLICATIONS

International Search Report and Written Opinion dated May 14, 2018, Application No. PCT/IB2018/050245, 12 pages.
Chinese Search Report dated Aug. 9, 2021 for Application No. 2018800074764.
Wang, Ying et al., "Optical Fiber Sensor For Berberine Based on Fluorescence Quenching of 2-(4-Diphenylyl)-6-Phenylbenzoxazole," Fresenius Journal of Analytical Chemistry, vol. 360, No. 6, Mar. 1998, 702-706.

* cited by examiner

OPTICAL SPECTROMETER MODULES, SYSTEMS AND METHODS FOR OPTICAL ANALYSIS WITH MULTIPLE LIGHT BEAMS

CROSS-REFERENCE TO RELATED APPLICATION

This application is a national stage entry pursuant to 35 U.S.C. § 371 of International Application No. PCT/IB2018/050245, filed on Jan. 16, 2018, which claims priority to Australian Application No. 2017900162, filed on Jan. 19, 2017, the contents of all of which are fully incorporated herein by reference.

TECHNICAL FIELD

The present disclosure generally relates to optical spectroscopy equipment and systems and methods of optical spectroscopy. More specifically, the present disclosure relates to equipment, systems and methods for optical spectroscopy with multiple light beams.

BRIEF DESCRIPTION OF DRAWINGS

Embodiments are described in further detail below, by way of example, with reference to the accompanying drawings briefly described below.

DETAILED DESCRIPTION

Figure 1:
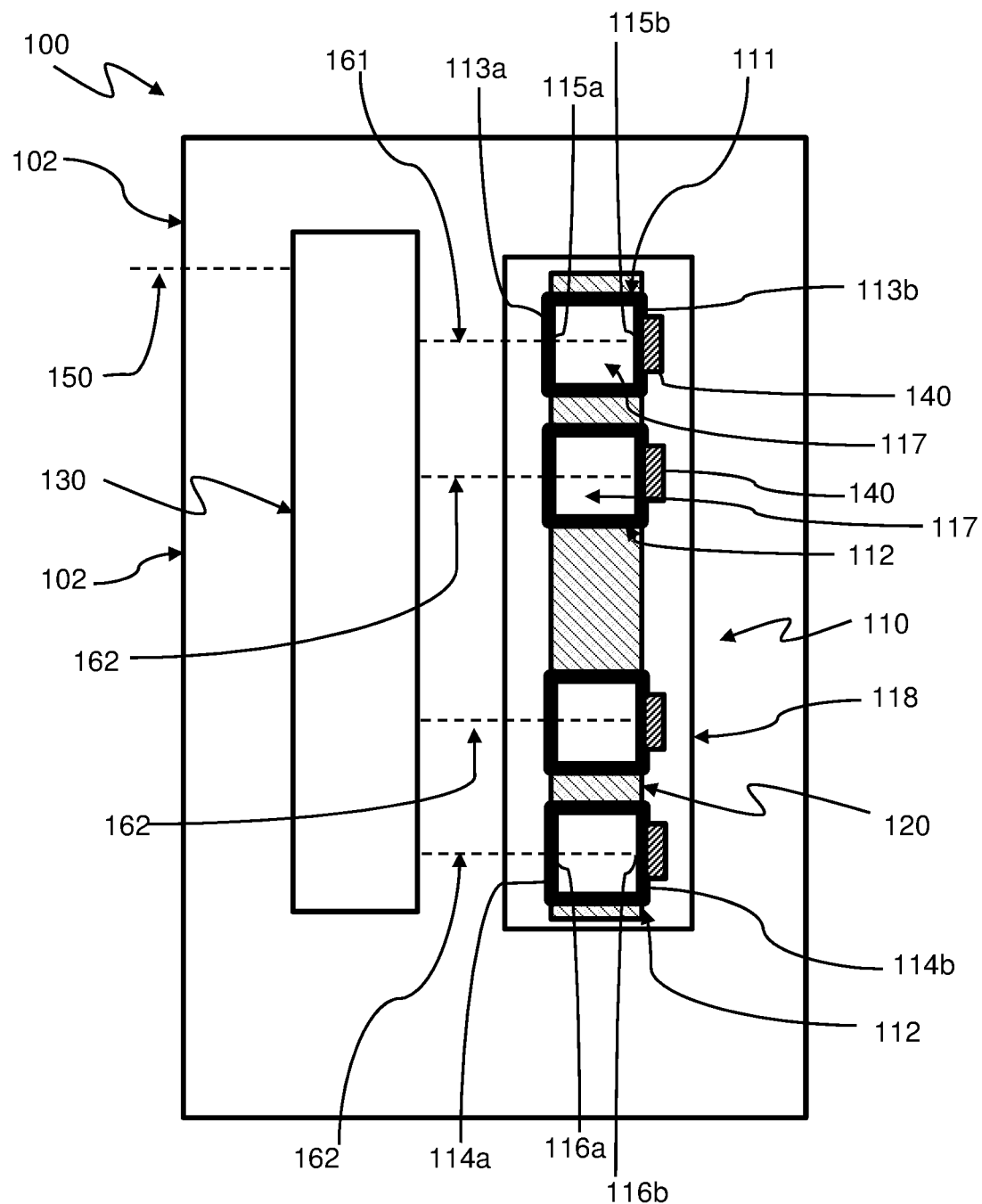
FIG. 1 is a top down view of an optical spectrometer module according to some embodiments.

Spectrometers are instruments used for the analysis of samples to identify the presence of or determine the concentrations of materials or substances (e.g. molecules, elements, or compounds) of interest, i.e. the analyte. Optical spectrometers, also known as spectrophotometers, may utilise electromagnetic energy in the form of light in the ultraviolet (UV), visible or infrared (IR) range that is directed to interact with a sample. By analysing the amount of light absorbed or emitted by each sample, a determination can be made as to the sample constituents and amounts. For example, UV-visible spectroscopy may expose samples to light with a wavelength in the UV-visible range. Measuring the characteristics of the resultant light following interaction with the sample (for example the light intensity and/or wavelengths of light transmitted, absorbed, or emitted by a sample) the type of analyte or amount of analyte can be evaluated. For example, the amount of optical absorption associated with a sample can be related to various analyte concentration(s) by calibration of the spectrometer.

A reference measurement may also be conducted where no sample is present and light is transmitted through the spectrometer for detection. This can be used to establish the baseline light intensity for comparison with the transmitted light through a sample for calculation of the level of optical absorption by the sample. For example, to account for instabilities in the light used, spectrometers may use a configuration where some of the light is diverted into a separate reference beam which is measured as a reference to account for variations in the optics and source of the instrument. These are known as dual-beam or double-beam spectrophotometers.

Samples for analysis with optical spectroscopy may possess fluidic or semi-fluidic properties or may be liquids, solids, gases or particulates suspended in a carrier such as a solvent or other medium that permit input light energy to interact with the sample and resultant-light properties to be evaluated. Liquid or fluid suspended samples to be analysed are typically contained in a sample cell known as a cuvette. The cuvette (often made from quartz) and carrier medium may contribute to the optical interactions and it may be important to also take the properties of these materials into consideration to accurately determine the presence and/or amount of analyte that may be present in the sample. Any contribution of the cuvette material and carrier medium to the resultant light detected from the cuvette can be taken into consideration by measurement of the light properties or transmission characteristics through a reference cuvette which contains the carrier medium (if used).

Alternatively, calibration data for a particular analyte may have been obtained using a specific solvent or carrier medium. In this case, it is not necessary to conduct a reference measurement with a cuvette or carrier medium. Absorption by the cuvette and/or carrier liquid can also be accounted for numerically or computationally during data analysis.

Optical spectrometers typically comprise a single light source and a sample holder configured to expose one or more samples including potentially a reference sample to selected wavelengths and intensities of light. The sample holder containing a given analyte of interest or reference sample may be exposed to monochromatic light from the light source and the light properties measured following interaction with the sample. For such instruments, it may be desirable to provide the ability to measure the light properties associated with multiple samples or references simultaneously without having to serially introduce single samples for analysis. Additionally, it is desirable to provide optical spectrometers with fewer or no moving parts as compared to conventional instrumentation.

Any discussion of documents, acts, materials, devices, articles or the like which has been included in the present specification is not to be taken as an admission that any or all of these matters: form part of the prior art base; were common general knowledge in the field relevant to the present disclosure as it existed before the priority date of each claim of this application; or could have been understood, regarded as relevant or reasonably expected to have been combined by a person skilled in the art.

Some embodiments of the present disclosure relate to a method of optical analysis comprising:

receiving light at an optical spectrometer module from a light source;

distributing the received light into two or more light beams with a light distribution component of the optical spectrometer module;

concurrently exposing each of a reference and one or more test samples to one of the two or more light beams; and concurrently measuring a property of the of light associated with each of the reference sample and one or more test samples with a corresponding detector.

In some embodiments, the method further comprises determining one or more analytes present in the one or more test samples by comparing the measured property of light associated with the reference with the measured property of light associated with the one or more test samples. The measured property of light may be an intensity of light. In various embodiments, the measuring may be conducted at a predetermined temperature.

The method of optical analysis may further comprise repeating the exposing and measuring at different wavelengths to concurrently obtain a characteristic spectrum for each of the reference sample and one or more test samples.

In some embodiments, the separating comprises receiving light at a fibre optic bundle of the light distribution component, the fibre optic bundle comprising two or more optical fibres, each optical fibre comprising:
a first end where the optical fibres are proximate to each other to enable the received light to be received at each of the first ends, and
a second end where the optical fibres are separated from each other,
wherein the light is received at the first ends and directed to the second ends, and each of the second ends is received by a corresponding receptacle so that the received light is distributed to each receptacle.

In some embodiments, the light is received at the first ends of the optical fibres via a first lens. The light may also be received at the first ends via an optical mixing fibre.

The two or more sample cells may be received and positioned in fixed locations relative to the light distribution component by a sample holder defining two or more receptacles; and the reference sample and the one or more test samples are contained in separate sample cells.

In some embodiments, each receptacle receives a light beam through an opening defined by a sidewall; and light transmitted through the receptacle leaves the receptacle through an exit defined by a sidewall opposite the opening to enable the transmitted light to be measured by the corresponding detector. The second end of the optical fibres may be received at the opening.

In some embodiments, the reference sample and each of the one or more test samples are exposed to the two of more light beams via second lenses.

In some embodiments, the separating comprises the received light being distributed by a network of beam-splitters of the light distribution component by dividing the received light to provide the two or more light beams.

The received light may be monochromatic. In other various embodiments, the method of optical analysis further comprises restricting the bandwidth of the received light with one or more monochromators in the optical spectrometer module to produce monochromatic light that the reference sample and the one or more test samples are exposed to.

The reference sample and the one or more test samples may be exposed to light beams with a beam spot diameter in the range of 1 mm to 3 mm.

In various embodiments, each sample cell may be received at a cell opening at an upper end of the receptacle, and the cell opening is located at a different location to the opening that receives the light beam and the exit.

Some embodiments of the present disclosure relate to an optical spectrometer module for analysing liquid samples comprising:
a light distribution component adapted to receive light from a light source and distribute the received light to concurrently provide two or more light beams;
a sample holder defining two or more receptacles adapted to:
receive and reproducibly position two or more sample cells in fixed locations with respect to the light distribution component,
concurrently receive the two or more light beams to thereby enable a reference sample and one or more test samples contained in the two or more sample cells to be concurrently exposed to the received light, and
enable light transmitted through the reference sample and the one or more test samples contained in the sample cells to exit the receptacles; and
two or more detectors, wherein each detector is located adjacent one receptacle to measure light transmitted through samples and enable concurrent measurements from the reference sample and the one or more samples to enable a level of optical absorption by the one or more samples to be determined.

In some embodiments, each receptacle comprises at least one sidewall defining:
an opening adapted to receive the one of the two or more light beams; and
an exit positioned opposite the opening to enable the light transmitted through samples to be measured by the two or more detectors.

Each receptacle may also define a cell opening at an upper end of the receptacle for receiving the sample cell.

The light distribution component may comprise a fibre optic bundle comprising two or more optical fibres, each optical fibre comprising:
a first end where sidewalls of the optical fibres are proximate each other to enable the received light to be received at each of the first ends, and
a second end where the optical fibres are separated from each other,
wherein each of the first ends receive the light to distribute the light over each of the second ends of the optical fibres, and each of the second ends is received by one of the receptacles to thereby enable each receptacle to receive one of the two or more light beams.

In some embodiments, the optical spectrometer module further comprises a first lens optically coupled to the first end to focus light onto the first ends. The first end of each optical fibre may be received by a corresponding receptacle at the opening.

In various embodiments, each of the second ends is optically coupled to a second lens.

In other embodiments, the light distribution component comprises a network of beam-splitters adapted to receive light from the light source and divide the received light to provide two or more light beams.

The light distribution component may evenly distribute the received light such that the two or more light beams have substantially equal intensities. The optical spectrometer module may be configured to provide light beams received at the receptacle with a beam spot diameter in the range of 1 mm to 3 mm.

In some embodiments, the light distribution component comprises two or more monochromators to produce monochromatic light for each of the two or more light beams.

The sample holder and receptacles may be fixed in position. The sample holder may also be coupled to an electro-thermal component.

Some embodiments of the present disclosure relate to a spectroscopy system comprising:
the optical spectrometer module according to some embodiments; and a light source module comprising an electrical arc lamp, wherein the optical spectrometer module and light source module are adapted to be removably connected to each other thereby enabling light from the light source to be received by the optical spectroscopy module.

The light source may further comprise a monochromator component for providing monochromatic light to the optical spectroscopy module.

In some embodiments, the spectroscopy system further comprises a computational unit adapted to compare a measured intensity of detected light from the reference sample to each of the one or more samples to thereby determine a concentration of analyte in each of the one or more samples.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Referring to FIG. 1, an optical spectroscopy module 100 is shown according to some embodiments. The optical spectroscopy module 100 may be provided as part of a modular system. The optical spectroscopy module 100 comprises a sample holder 110 and a light distribution component 130. Each sample holder 110 comprises two or more receptacles 111, 112 adapted to receive and reproducibly position a reference sample cell (not shown) and one or more sample cells (not shown) in fixed locations with respect to the light distribution component 130.

In some configurations, the reference receptacle 111 is adapted to receive the reference cell and one or more test sample receptacles 112 are adapted to receive the sample cells. The reference cells and sample cells may be cuvettes. The reference cuvette is configured to contain a carrier liquid and the sample cuvettes are configured to contain liquid test samples.

The receptacles 111 may, however, be left empty and used without a reference cuvette or without a reference material to obtain a reference signal for correcting instrument variation by measuring the transmitted light through as a reference beam.

The light distribution component 130 is adapted to receive light 150 from a light source (not shown) and distribute the received light 150 to concurrently provide two or more light beams 161, 162 to the receptacles 111, 112.

The provided light beams may comprise a reference beam 161 and one or more test beams 162. In some embodiments, the light distribution component 130 provides two or more reference beams 161 and two or more test beams 162.

Figure 2:
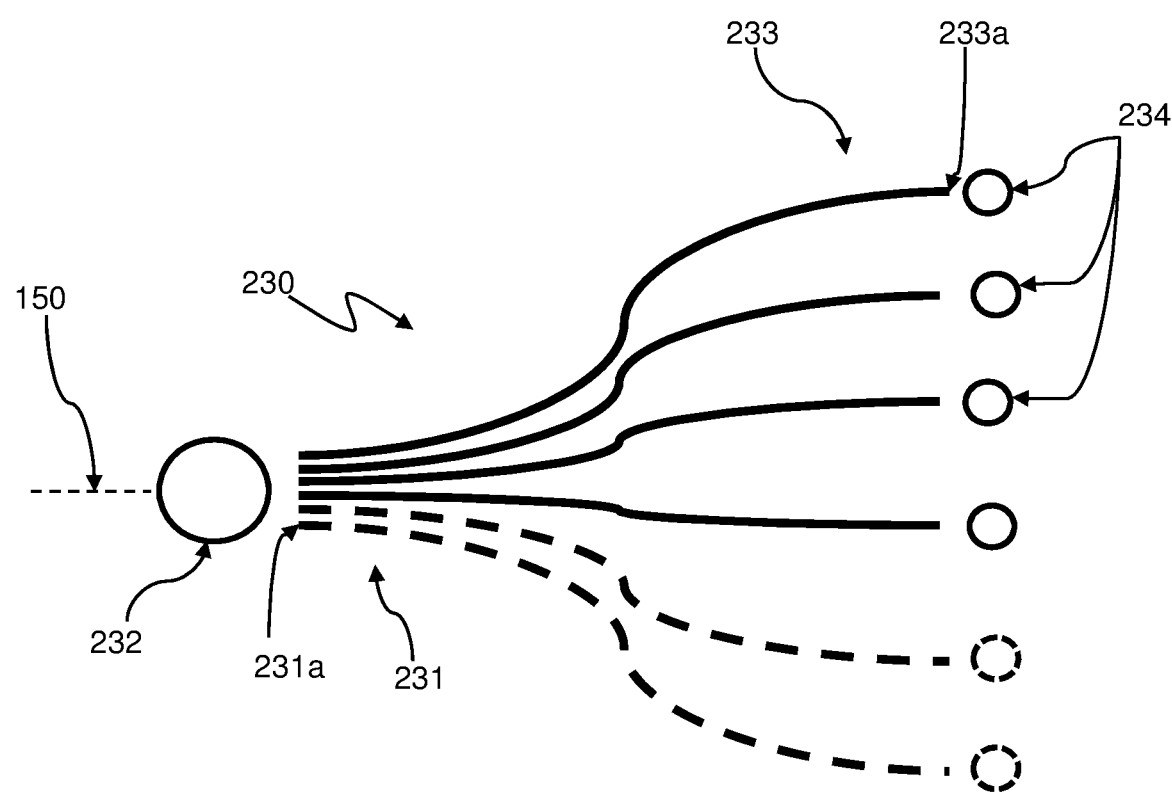
FIG. 2 is a schematic diagram of a light distribution component according to some embodiments.

Referring to FIG. 2, in some embodiments the light distribution component 130 comprises a fibre optic bundle 230. The fibre optic bundle 230 comprises at least two optical fibres. The fibre optic bundle 230 may for example comprise 2, 3, 4, 5, 6, 7, 8 or more than 8 optical fibres. Optical fibres may be bundled at a first end 231 so that they are proximate each other to enable the received light 150 to be received at a first terminal portion 231a of the optical fibres. The sidewalls of adjacent optical fibres may, for example, be coupled optically or physically connected to abut each other.

The terminal portion 231a may be optically coupled to the received light 150 via optical focusing or light directing elements including for example a lens 232 adjacent the terminal portion 231a. The lens 232 may focus or direct the received light 150 through the first terminal portion 231a of the optical fibres in the fibre optic bundle 230. The optical fibres may then be located or separated from each other at a second end 233 to direct light beams 161, 162 to the receptacles 111, 112. In various embodiments, each directed light beam 161, 162 has substantially the same properties such as wavelength and/or intensity so that one or more samples and/or references are exposed to light with similar characteristics. Such exposure may desirably occur substantially simultaneously to permit improved sample analysis and data acquisition.

In some embodiments, the lens 232 focuses the received light 150 onto an optical mixing fibre (not shown). The optical mixing fibre then abuts the terminal portion 231a to optically couple to each optical fibre. The optical mixing fibre advantageously reduces the effect of any spatial variation in intensity of light at the first terminal portion 231a on the intensities of light at second terminal portions 233a near the second end 233 of each optical fibre.

The received light 150 may be directed into the optical spectroscopy module 100 by an input optical fibre (not shown) and optically couple to the lens 232. The lens 232 may, for example abut the first terminal portion 231a.

The optical fibres may have an external diameter (over cladding) in the range of approximately 0.6 mm to approximately 1 mm. In some embodiments, the optical fibres have a diameter of about 0.8 mm but may be as small as 0.2 mm.

Each second terminal portion 233a is positioned with respect to a corresponding receptacle 111, 112 such that each second terminal portion 233a may be optically coupled to a respective or corresponding optical element such as a second lens 234. The second lens 234 directs or focuses the light beams 161, 162 through the receptacles 111, 112 to a detector (not shown). In some embodiments, the second lens 234 is sized and/or positioned such that it focuses the light beams 161, 162 to a beam spot with a diameter in the range of 1 mm to 3 mm at a near side of the receptacle 111, 112. The second lens 234 advantageously focuses the light beams 161, 162 to maximise the intensity or flux of light that reaches the detector. Maximising the flux of measured light at the detector may assist to improve the accuracy of optical analysis.

In some embodiments, lenses 232, 234 are ball lenses or plano-convex lenses.

Using an optical fibre bundle to distribute the received light 150 advantageously provides a convenient and efficient means for coupling multiple light beams 161, 162 into the receptacles 111, 112 without the need to move the sample holder 110 or receptacles 111, 112.

The receptacles 111, 112 are adapted to concurrently receive the two or more light beams 161, 162 to thereby enable the one or more reference and one or more test samples to be concurrently exposed to the received light beams 161, 162. In some configurations, the reference comprises an empty receptacle 111 that does not contain a reference cuvette or a reference sample.

The sample holder 110 and receptacles 111, 112 may be fixed in position. As multiple light beams are provided so that each receptacle 111, 112 of the sample holder 110 concurrently receives light, there is no need to move the sample holder 110 for light to be received by each receptacle 111, 112. This advantageously simplifies the construction of the optical spectrometer module and may reduce the need for repairs as there are fewer moving parts.

Each sample holder 110 is further adapted to enable light transmitted through the one or more test samples (which may be contained in cuvettes) and any reference to exit the receptacles 111, 112.

The receptacles 111, 112 may comprise a cuvette opening 117 configured to receive cuvettes with a body of a selected shape such as a rectangular prism or cube. The cuvette opening 117 may be shaped (e.g. as a square) with dimensions in the range of 10-20 mm. The receptacle 111, 112 may have a depth in the range of 30-50 mm. The cuvette opening 117 is sized slightly larger than the dimensions of the cuvette they are designed to accommodate to provide a clearance. For example, the receptacles 111, 112 may comprise a 14×14 mm square opening and a depth of 40 mm to accommodate cuvettes comprising a body with a 12.5×12.5 mm square base and a height of 45 mm high. The clearance may be taken up by a spring or other resiliently biased component which may be mounted diagonally to locate the cuvette on two of its four sides into a corner of the receptacle 111, 112. The receptacle 111, 112 may have a depth less than the height of the cuvette so that a sufficient amount of the cuvette is exposed to allow it to be gripped in the fingers for removal.

The sample holder 110 may be further adapted to receive the reference beam 161 and the one or more test or analyte detection beams 162 at receptacles 111, 112. For example, the reference receptacle 111 may comprise a first wall 113a defining an opening 115a to enable the reference beam 161 to be directed into the reference cuvettes received in each of reference receptacles 111. The sample receptacles 112 may also comprise a first sample wall 114a that each define a further opening 116a to enable each of test beams 162 to be directed into the sample cuvettes received in each of sample receptacles 112.

In some embodiments the openings 115a and further openings 116a may have a dimensions in the range of about 2 mm to 5 mm. For example, the openings 115a and further openings 116a may have a width of about 2 mm and a height of about 2.5 mm.

The openings 115a, 116a may comprise additional optical elements including for example lens 234 to assist in the directing or focussing the light beams 161, 162 through the receptacles 111, 112.

Sample holder 110 is also further adapted to enable light transmitted through the reference receptacles 111 and the samples receptacles 112 to exit the receptacles 111, 112. This enables one detector 140 to be placed adjacent each receptacle 111, 112 to enable concurrent measurements of the intensity of transmitted light through the reference sample and the one or more samples to concurrently determine multiple levels of optical absorption by two or more samples. For example, the reference receptacle 111 may comprise a second wall 113b opposite the first wall 113a. The second wall 113b defining an exit 115b to enable the reference beam 161 that has been transmitted across the reference receptacle 111 and through a reference cell to be directed into one of the detectors 140. The sample receptacles 112 may also comprise a second sample wall 114b opposite the first sample wall 114a that define a further exit 116b to enable each of test beams 162 that have been transmitted across the sample receptacle 112 and through the cuvettes to be directed into another one of the detectors 140.

The optical spectroscopy module 100 may also further comprise an electro-thermal component 120. The electro-thermal component 120 is thermally coupled to the receptacles 111,112 to control and adjust the temperature of one or more test samples and any reference samples received by the receptacles 111,112. For example, a predetermined temperature may be maintained during measurement. This may be useful as optical absorption by a sample can be affected by the temperature of the sample.

The electro-thermal component 120 is located so as to allow light beams 161, 162 to be received by the receptacles 111, 112 and to allow detectors 140 to measure light transmitted through the receptacles 111, 112. In some embodiments, the electro-thermal component 120 is located underneath the receptacles 111, 112.

The receptacles 111, 112 may be formed from a high thermal conductivity material to assist in uniform heating of one or more of receptacles 111, 112, sample cuvettes, reference cuvettes, samples, carrier liquids and reference substances. For example, the receptacles 111, 112 may be formed from a high thermal conductivity material such an aluminium alloy, copper or graphite.

The thermal conductivity of the high thermal conductivity material may be greater than about 50 W/m K. The thermal conductivity of the high thermal conductivity material may be greater than about 100 W/m K.

In some embodiments, the electro-thermal component 120 includes a thermoelectric device such as a Peltier device to controllably adjust the temperature of the sample holder 110. The Peltier device may be coupled to the sample holder 110 between the sample holder 110 and a base 102 of the optical spectroscopy module 100.

In some embodiments, the electro-thermal components 120 comprise a heat exchange component (not shown). The heat exchange component may advantageously assist in transferring heat from one side of the Peltier device to the opposite side to enable the temperature of the test samples and any reference sample to be controlled. The base 102 may, for example, act as a heat sink for the sample holder 110.

In some embodiments, the base 102 may include an internal channel to enable a liquid to flow through it to transfer heat between the liquid and the sample holder 110 via the electro-thermal component 120. For example, the base 102 may be adapted to enable water to flow through the base 102.

In other embodiments, the electro-thermal component 120 may comprise a resistive heating device (not shown) to heat the sample holder 110 as well as the heat exchange component. The heat exchange component may remove heat directly from the sample holder 110 in cooperation with the resistive heating device to enable the temperature of the reference sample and test samples to be controlled.

According to some embodiments, the sample holders 110 further comprises a support 118. The support 118 is attached to the receptacles 111, 112 between the receptacles 111, 112 and the base 102 of the optical spectrometer module 100. The support 118 thereby separates the receptacles 111, 112 from the base 102.

In some embodiments, the support 118 acts as part of a heat exchange component to assist in heat transfer between the electro-thermal component 120 and the environment surrounding the support 118. The support 118 may therefore be formed from a high thermal conductivity material. The optical spectrometer module 100 may further comprise two or more detectors 140, wherein each detector 140 is located or positioned adjacent to a corresponding receptacle 111, 112 to acquire or measure light transmitted through reference samples and test samples and enable concurrent measurements from the reference sample and the one or more samples to enable a level of optical absorption by the one or more test samples to be concurrently determined. As measurements can be concurrently performed this may advantageously reduce the total amount of time required to perform optical analysis of the test samples.

In some embodiments, each detector 140 is attached to its corresponding receptacle 111, 112 and directly measures the light transmitted through the reference samples. This advantageously minimises any loss of intensity in transmitted light as there are no additional optical components between the detector 140 and the receptacles 111, 112. It is in part practical to directly attach the detector 140 to the receptacles 111, 112 because the sample holder 110 does not move and is fixed in position. As there is no need for a movement mechanism in the optical spectrometer module 100, there is additional room to directly include the detectors 140 in the optical spectrometer module 100.

In some embodiments, the optical spectrometer module 100 further comprises a temperature controller (not shown) coupled to the electro-thermal component 120. The temperature controller is configured to control and/or maintain the temperature of electro-thermal component 120, receptacles 111, 112 and/or the reference sample and test samples.

The optical spectrometer module 100 may also comprise a plurality of temperature sensors to measure the temperature of one or more of the electro-thermal components 120 and receptacles 111, 112. The thermal temperature controller may be coupled to the temperature sensors to use the temperature measured by the temperature sensor in a feedback system.

Figure 3:
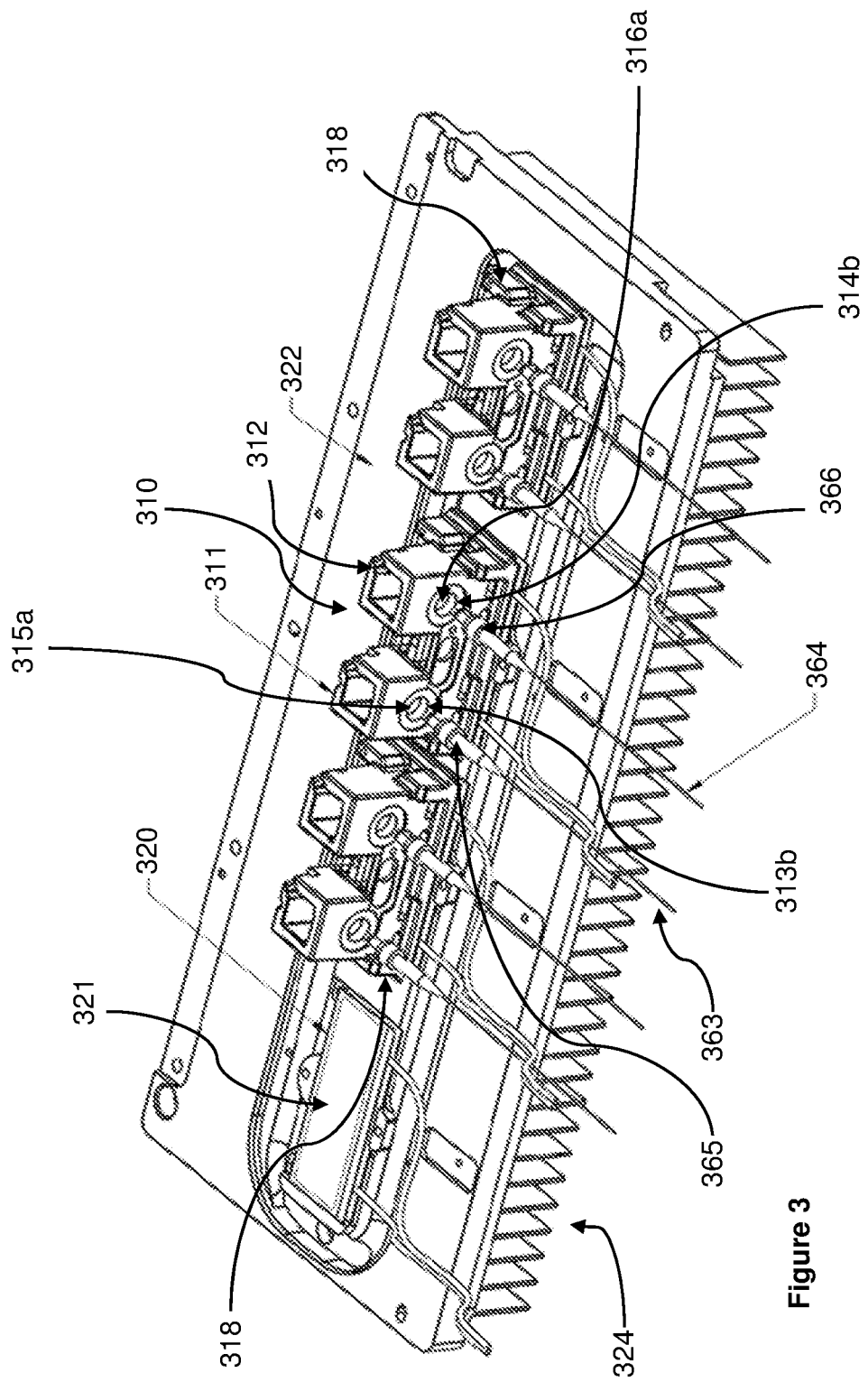
FIG. 3 is a perspective view of a set of sample holders for an optical spectrometer module according to some embodiments.

Referring to FIG. 3, a set of sample holders 310 adapted to be included in the optical spectrometer module 100 is shown according to some embodiments. Each sample holder 310 comprises a reference receptacle 311 and at least one sample receptacle 312. The sample holders 310 share a common heat sink 322 but are otherwise the same as sample holder 110. Four such sample holders 310 are provided for in the illustrated embodiment, one of the sample holders 310 is not shown to enable an underlying electro-thermal component 320 to be seen.

The reference beams and test beams (not shown) may be provided and thereby received by the reference receptacle 311 and sample receptacles 312 via optical fibre cables 363 and 364 respectively. The receptacle 311, 312 define openings 315a, 316a to enable the reference and test beams to be directed into the reference cuvette and test sample cuvette received in each of receptacles 311, 312.

The receptacle 311, 312 may also define recesses 313b, 314b to couple to an end 365, 366 of the optical fibre cables 363, 364 and assist in fixing them in position. This advantageously enables the reference cuvettes and sample cuvettes to be reliably and consistently placed in correct alignment relative to the light beams received. This simplifies the construction and design of the optical spectroscope module as the sample holders 310 are not moving relative to the light beams.

In some embodiments, the receptacles 311, 312 have a height of about 45 mm. The openings 315a, 316a and recesses 313b, 314b may be circular and centred 15 mm above the base of the receptacles 311, 312.

In some embodiments, the sample holder 110 and the set of sample holders 310 may be fixed in position during measurement but otherwise removable. The sample holders 110, 310 may, for example, be fixed by fasteners such as screws, clips or by slotting into place. The sample holders 110, 310 may, for example be removed for maintenance, repair or replacement.

The electro-thermal components 320 are thermo-electric devices as described above. An upper side 321 of the electro-thermal components 320 is thermally coupled to the base of the reference receptacle 311 and the sample receptacles 312. The heat sink 322 is thermally coupled to an underside (not shown) of the electro-thermal component 320. The heat sink 322 comprises a plurality of vanes 324 that extend away from the electro-thermal component to assist in heat dissipation. In some embodiments, a single electro-thermal component 320 is used to control the temperature of all the receptacles 311, 312.

The optical spectroscopy module 100 may also comprise a blower or fan (not shown). The blower is arranged to direct air over the plurality of vanes 324 to thereby further assist in heat transfer to or from the heat sink 322.

The electro-thermal component 120, 320 may be adapted to adjust the temperature of the sample holder 110, 310 over the range between −10° C. and 110° C.

A spectroscopy system is also disclosed comprising the optical spectrometer module 100 removably coupled to a light source module (not shown). The light source module comprises a lamp. For example, the lamp may be a high output flash lamp such as an electrical arc lamp that is capable of producing a pulsed light output with an energy of up to 0.5 J per pulse (per flash) at a rate of up to 300 Hz. Advantageously, the output light intensity may be divided into up to 8 light beams, each with sufficient intensity to perform optical spectroscopy. The high output lamp also produces light over a range of wavelengths between 190 nm to 2500 nm. In some embodiments, the lamp may be a short-arc flash-lamp comprising electrodes contained in pressurised Xenon gas. For example, the light source module may comprise a 1100 series FX-1160 short-arc flash lamp produced by Exelitas Technologies.

Providing the spectroscopy system as a modular system advantageously enables interchange and interoperability between modules for different applications. The light source module may, for example, be interchanged between the optical spectroscopy module 100 disclosed herein and another optical spectroscopy module. This provides the end user with the flexibility to use a common module to save costs or to readily interchange a faulty module if necessary.

The light source module may also comprise a monochromator component to produce an output light beam 150 with a narrow wavelength range (monochromatic) light beam 150. The output light may, for example, have a bandwidth in the range of 0.1 to 5 nm.

In some embodiments, the light source module further comprises a slit or aperture and a lens for focussing the produced light into an optical fibre. The optical fibre may then be fed into the light distribution component 130 of the optical spectrometer module 100.

In some embodiments, the light distribution component 130 comprises one or more monochromator components to produce (monochromatic) light beams 161, 162 that have a narrow wavelength range.

The spectroscopy system may further comprise a computational unit adapted to receive light intensity data from the optical spectroscopy module 100. The computational unit comprising a processor adapted to compare a measured intensity of detected light from the reference sample to each of the one or more test samples to thereby determine the level of optical absorption by the one or more samples and generate optical absorption data.

Figure 4:
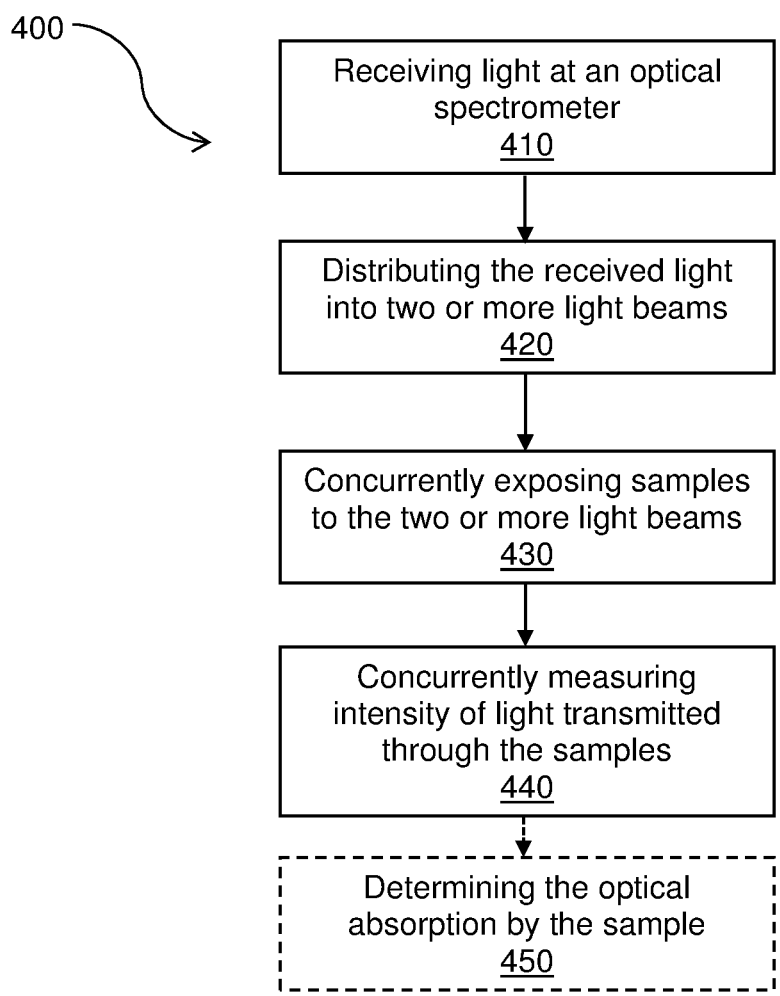
FIG. 4 is a flowchart for a method of optical analysis according to some embodiments.

Referring to FIG. 4, a flowchart illustrating a method of optical analysis 400 according to some embodiments is shown. The method 400 comprises receiving light 150 at the optical spectrometer module 100, at 410. The method 400 further comprising, at 420, distributing the received light 150 into two or more light beams 161, 162 with the light distribution component 130 of the optical spectrometer module 100. A reference and one or more test samples received by receptacles 111, 311, 112, 312 in the sample holder 110, 310 are concurrently exposed to the light beams 161, 162, at 430. The method 400 further comprises, concurrently measuring a property of the light associated with each of the reference samples and one or more test samples with a corresponding detector 140, at 440. For example, the intensity of light may be concurrently measured.

The light associated with the reference samples and one or more test samples may, for example, have been transmitted through the reference samples and one or more test samples.

The method 400 may also comprise determining one or more analytes present in the one or more test samples by comparing the measured property of light associated with the reference with the measured property of light associated with the measured property of light associated with the one or more test samples, at 450. This can, for example, be performed by dividing the measured intensity of light associated with the reference with the measured intensities of light associated with the one or more test samples.

In some embodiments, the method 400 comprises receiving the two or more light beams 161, 162 at each receptacle 111, 311, 112, 312 with no reference material, sample or cuvette present. The intensity of light that passes through each receptacle 111, 311, 112, 312 is then measured with a corresponding detector 140. A baseline for sample measurements can be determined by dividing the measurement obtained for the receptacle where a sample will be placed with the measurement from a receptacle to be used as a reference.

The comparison of the measured properties of light associated with a reference and one or more test samples may be performed digitally with a computing unit after the measured properties are received by the computing device. Alternatively, the comparison may be performed in an analogue manner through appropriate electronic circuits and devices.

In some embodiments, method 400 comprises repeating the exposing 430 and measuring 450 at different wavelengths to concurrently obtain a characteristic spectrum for each of the reference sample and one or more test samples. For example, the characteristic spectrum may be an intensity spectrum.

The sample holders 110, 310 may be maintained within an operating margin of a predetermined temperature during sample measurement 120, 320. The temperature may be maintained by controllably heating the sample holders 110, 310 with an electro-thermal component 120, 320.

The operating margin may be in the range of 0.05° to 5°. For example, the measurement temperature may be within 0.05° of the predetermined temperature, or the measurement temperature may be within 2° of the predetermined temperature. The operating margin depends on the application of the optical spectrometer module 100, for example, the operating margin may depend on the temperature sensitivity of the experiment or the sensitivity of the absorption by the sample to temperature.

The light beams 161, 162 comprise light with wavelengths in a narrow bandwidth (monochromatic). The received light 150 may be monochromatic. However, in some embodiments, the method 400 comprises receiving light 150 as broadband light and producing monochromatic light beams 161, 162 with the light distribution component 130.

Method 400 may also be repeated over a range of different predetermined temperatures to concurrently obtain measured intensities and determine optical absorption data for the one or more test samples over the range of temperatures. For example, the temperature of reference samples and test samples may be continually or periodically changed and measurements can be taken when the temperatures are within the operating margin of the predetermined temperatures.

Figure 5:
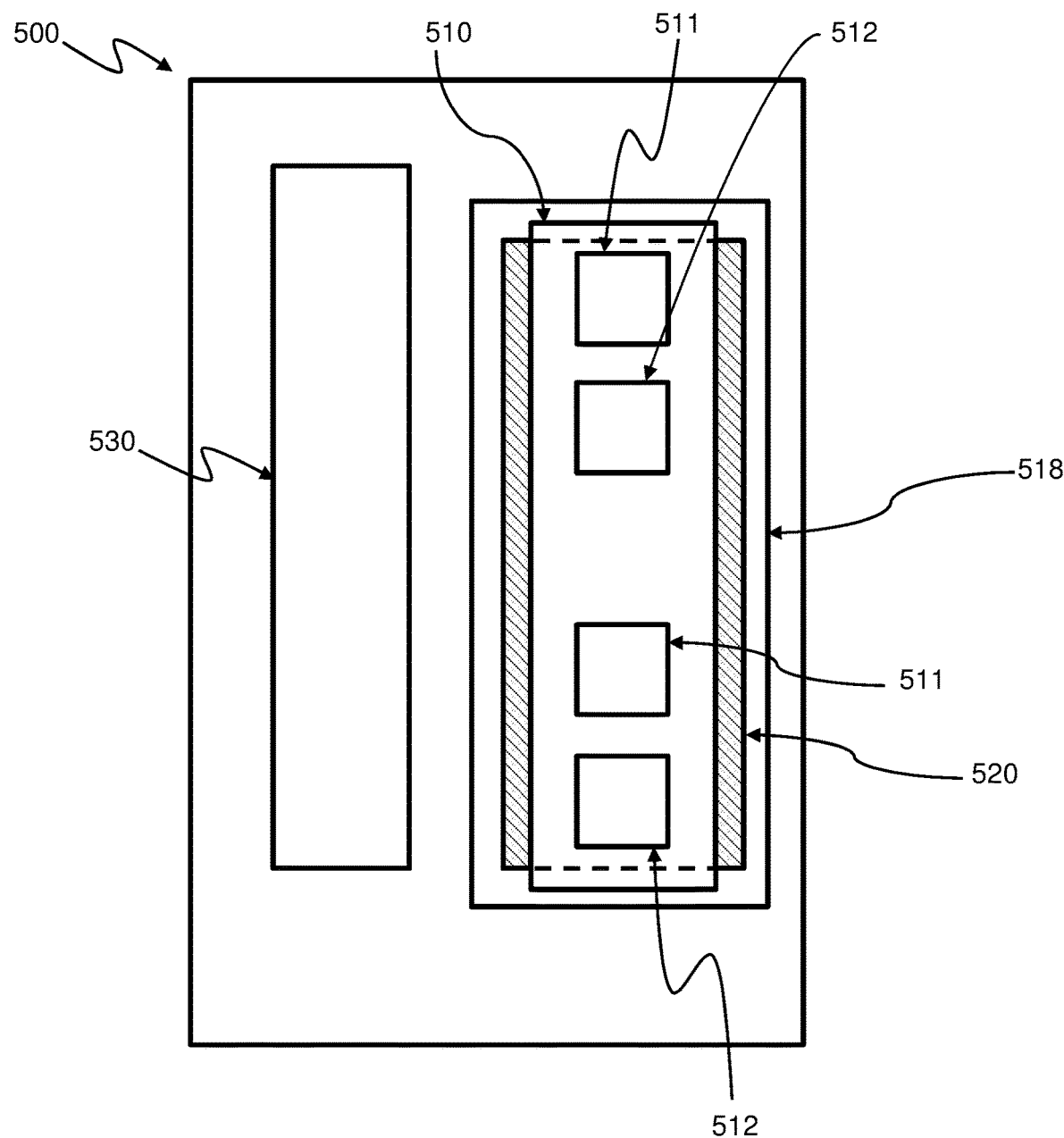
FIG. 5 is a top down view of an optical spectrometer module according to some embodiments.

Referring to FIG. 5, an optical spectroscopy module 500 is shown according to some embodiments. The optical spectroscopy module 500 may comprise a single sample holder 510 and a support 518. The sample holder 510 defines receptacles 511, 512. The support 518 is attached to the sample holder 510 and may locate the sample holder 510 in a fixed position with respect to the light distribution component 530 within the optical spectrometer module 500.

The support 518 may also act as a heat exchange component as described above (not shown) coupled to an electro-thermal component 520.

In some embodiments, the support 518 may be formed from a low thermal conductivity material to restrict the heat transfer between the sample holder 510 and the support 518. In these embodiments, the electro-thermal component 520 may be coupled to a separate heat exchange component as described above.

Figure 6:
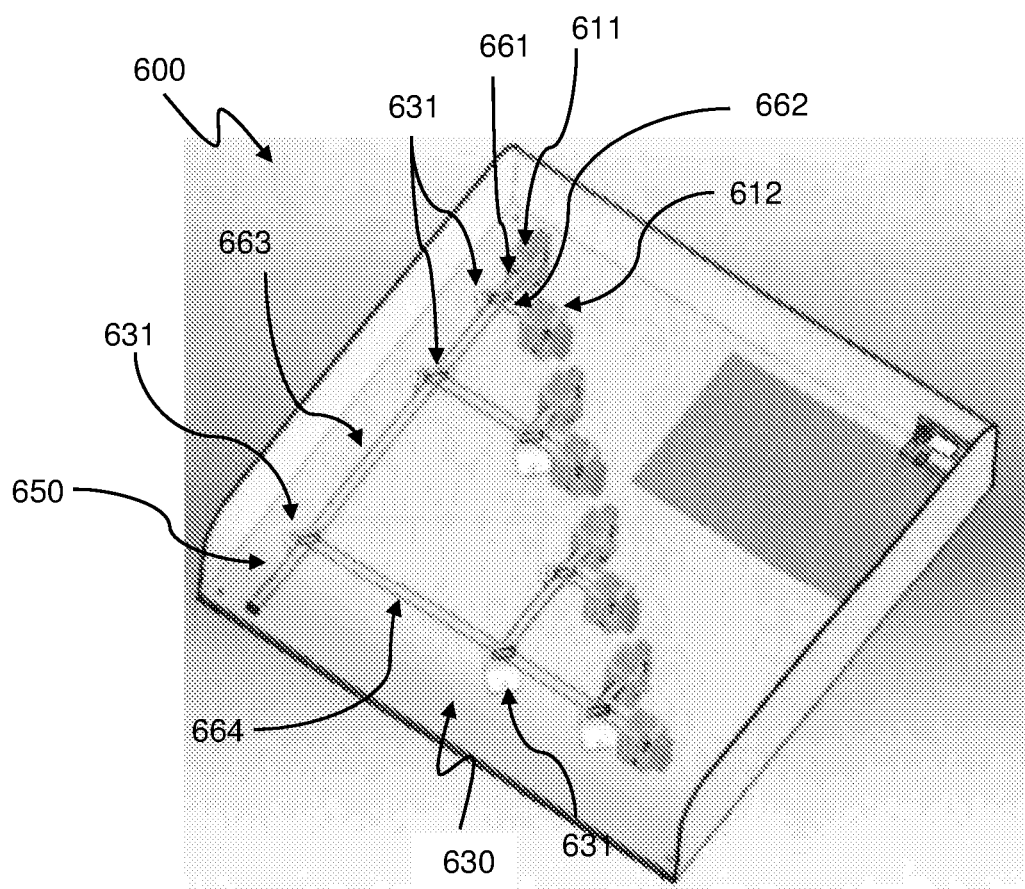
FIG. 6 is a top down view of an optical spectrometer module according to some embodiments.

Referring to FIG. 6, an optical spectrometer module 600 is shown according to some embodiments. The optical spectrometer module 600 comprises two or more receptacles 611, 612 and the light distribution component 630 comprises a network of beam-splitting mirrors 631, configured to provide light beams 661, 662. Each beam splitting mirror 631 may receive an incident light beam 650 and equally divide the intensity of the incident beam into two outgoing beams 663, 664. The network of beam splitting mirrors 631 produces n+1 light beams 661, 662 where n is the number of beam splitting mirrors 631. Beam-splitting mirrors advantageously provide light beams 661, 662 with minimal chromatic aberration compared to use of lenses.

Careful alignment of the beam-splitters is required to direct the light beams 661, 662 into the receptacles 611, 612 which are identical to receptacles 111, 112, 511, 512 described above. A sample holder 110, 310, 510 (not shown) may either define or comprise receptacles 611, 612 as described above.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method of spectroscopic analysis comprising the following steps:
   providing a light source;
   distributing light from the light source into at least three light beams;
   arranging a plurality of samples in a fixed arrangement configured to expose each of the plurality of samples to one of the at least three light beams;
   detecting, via a plurality of detectors, one or more properties of the light transmitted through each of the plurality of samples, wherein each detector of the plurality of detectors is respectively located adjacent a corresponding sample of the plurality of samples; wherein no additional optical components are between each detector of the plurality of detectors and the corresponding sample of the plurality of samples; and
   simultaneously exposing the plurality of samples to the light beams for simultaneous analysis;
   wherein distributing the light from the light source into at least three light beams comprises receiving light from the light source at a light distribution component including a fibre optic bundle comprising at least three optical fibres, and a first lens, wherein the at least three optical fibres are optically coupled to each other via the first lens, each optical fibre comprising:
a first end at which the at least three optical fibres abut each other to enable the light from the light source to be received via the first lens and an optical mixing fibre, wherein the light is received at the first ends of the at least three optical fibres via the first lens being adjacently positioned at the first ends of the at least three optical fibres; and
a second end at which the at least three optical fibres are separated from each other and received by a corresponding sample holder configured to receive at least one sample of the plurality of samples so that the received light is distributed to each sample holder.

2. The method of spectroscopic analysis according to claim 1, wherein the light is received from the second ends of the optical fibres via a second lens.

3. The method of spectroscopic analysis according to claim 1, wherein at least three sample cells are received and positioned in fixed locations relative to the light distribution component in the sample holders.

4. The method of spectroscopic analysis according to claim 3, wherein at least one reference sample and the two or more test samples are contained in separate sample cells.

5. The method of spectroscopic analysis according to claim 4, wherein:
each sample holder receives a light beam through an opening defined by a sidewall; and
light transmitted through the sample holder leaves the sample holder through an exit defined by a sidewall opposite the opening to enable the transmitted light to be measured by a corresponding detector.

6. The method of spectroscopic analysis according to claim 5, wherein the second end of the optical fibres is received at the opening of the sample holder.

7. A method of spectroscopic analysis according to claim 1, wherein the step of distributing the received light into three or more light beams involves distributing the received light into as many as eight light beams and each of a reference and up to seven test samples are concurrently exposed to the eight light beams.

8. An optical spectrometer module for analysing liquid samples comprising:
a light distribution component adapted to receive light from a light source and distribute the received light to concurrently provide three or more light beams;
a sample holder defining three or more receptacles adapted to:
receive and reproducibly position three or more sample cells in fixed locations with respect to the light distribution component,
concurrently receive the three or more light beams to enable at least one reference sample and two or more test samples to be concurrently exposed to the received light; and three or more detectors, wherein each detector of the three or more detectors is respectively located adjacent a corresponding receptacle of the three or more receptacles of the sample holder to measure light transmitted through the samples and enable concurrent measurements from the reference sample and the test samples to enable a level of optical absorption by the samples to be determined; wherein no additional optical components are between each detector of the three or more detectors and the corresponding receptacle of the three or more receptacles;
wherein the light distribution component comprises a fibre optic bundle comprising three or more optical fibres and a first lens, wherein the at least three optical fibres are optically coupled to each other via the first lens, each optical fibre comprising:
a first end at which the at least three optical fibres abut each other to enable the light from the light source to be received via the first lens and an optical mixing fibre, the light is received at the first end via the first lens being adjacently positioned at the first end of the at least three optical fibres; and
a second end at which the at least three optical fibres are separated from each other and received by a corresponding sample holder configured to receive at least one sample so that the received light is distributed to each sample holder.

9. The optical spectrometer module of claim 8, wherein each sample holder comprises at least one sidewall defining:
an opening adapted to receive the one of the light beams; and
an exit positioned opposite the opening to enable the light transmitted through sample holder to be measured by the detector.

10. The optical spectrometer module of claim 8, further comprising a second lens optically coupled to the second ends of the optical fibre.

11. The optical spectrometer module of claim 8, wherein the first end of each optical fibre is received by a corresponding sample holder at the opening.

12. The optical spectrometer module of claim 8, wherein the light distribution component distributes the received light such that the three or more light beams have substantially similar characteristics.

13. The optical spectrometer module of claim 8, wherein the sample holders are fixed in position.

14. The optical spectrometer module of claim 8, wherein the light distribution component distributes the light to concurrently provide as many as eight light beams and the sample holder defines eight receptacles adapted to receive and reproducibly position up to eight samples including a reference sample and up to seven test samples.

* * * * *